United States Patent
LeBlanc et al.

(10) Patent No.: US 10,460,044 B2
(45) Date of Patent: Oct. 29, 2019

(54) METHODS AND SYSTEMS FOR TRANSLATING NATURAL LANGUAGE REQUIREMENTS TO A SEMANTIC MODELING LANGUAGE STATEMENT

(71) Applicant: General Electric Company, Schenectady, NY (US)

(72) Inventors: Emily Cooper LeBlanc, Niskayuna, NY (US); Andrew Crapo, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 15/606,542

(22) Filed: May 26, 2017

(65) Prior Publication Data
US 2018/0341645 A1 Nov. 29, 2018

(51) Int. Cl.
*G06F 17/28* (2006.01)
*G06F 17/27* (2006.01)

(52) U.S. Cl.
CPC ............ *G06F 17/289* (2013.01); *G06F 17/27* (2013.01); *G06F 17/271* (2013.01);
(Continued)

(58) Field of Classification Search
CPC ...... G06F 17/271; G06F 17/2872; G06F 8/35; G05B 2219/23243
See application file for complete search history.

(56) References Cited

U.S. PATENT DOCUMENTS 5,555,169 A 9/1996 Namba et al.
5,748,973 A * 5/1998 Palmer .................... G06F 17/27
704/9
(Continued)

FOREIGN PATENT DOCUMENTS

WO 98/00793 A1 1/1998

OTHER PUBLICATIONS

Selway, Matt, et al. "Formalising natural language specifications using a cognitive linguistic/configuration based approach." Information Systems 54 (2015): 191-208. (Year: 2015).*
(Continued)

Primary Examiner — Brian L Albertalli
(74) Attorney, Agent, or Firm — Buckley, Maschoff & Talwalkar, LLC

(57) ABSTRACT

A system, computer-readable medium, and a method including receiving a textual representation of a natural language expression for a system requirement; analyzing, by the processor, the textual representation of the natural language expression to determine a natural language object, the natural language object including the textual representation of the natural language expression and syntactic attributes derived therefrom; traversing, by the processor, a grammar graph representation of a modeling language to determine a partial translation of the natural language object, the partial translation including at least one ontology concept placeholder; determining, by the processor, ontology concepts corresponding to the at least one ontology concept placeholder to complete a translation of the textual representation of the natural language expression; and generating a record of the completed translation.

20 Claims, 7 Drawing Sheets

(52) U.S. Cl.
CPC .......... *G06F 17/274* (2013.01); *G06F 17/277* (2013.01); *G06F 17/2785* (2013.01)

(56) References Cited

U.S. PATENT DOCUMENTS

| | | | |
|---|---|---|---|
| 6,442,516 | B1 | 8/2002 | Lee et al. |
| 6,681,383 | B1* | 1/2004 | Pastor .................. G06F 8/30 717/126 |
| 8,050,907 | B2* | 11/2011 | Baisley ................ G06F 17/271 704/10 |
| 8,412,516 | B2* | 4/2013 | Verma .................. G06F 17/274 704/9 |
| 8,561,014 | B2* | 10/2013 | Mengusoglu ............. G06F 8/10 704/9 |
| 8,935,148 | B2 | 1/2015 | Christ |
| 9,116,886 | B2 | 8/2015 | Chin et al. |
| 9,436,681 | B1 | 9/2016 | Tunstall-Pedoe et al. |
| 2007/0033579 | A1 | 2/2007 | Andrews et al. |
| 2007/0282594 | A1 | 12/2007 | Spina |
| 2008/0109475 | A1* | 5/2008 | Burmester .......... G06F 17/2785 |
| 2009/0234640 | A1* | 9/2009 | Boegl .................. G06F 8/10 704/9 |
| 2010/0275159 | A1 | 10/2010 | Matsubara et al. |
| 2013/0173247 | A1 | 7/2013 | Hodson |
| 2013/0326336 | A1* | 12/2013 | Lanque ................ G06F 17/218 715/234 |
| 2014/0172417 | A1* | 6/2014 | Monk, II ............ G06F 17/2785 704/9 |
| 2015/0286631 | A1* | 10/2015 | Sethu .................. G06F 17/2211 704/9 |
| 2016/0117345 | A1* | 4/2016 | Tsai ...................... G06F 16/282 707/786 |
| 2016/0299884 | A1* | 10/2016 | Chioasca ............ G06F 17/2705 |
| 2016/0371238 | A1* | 12/2016 | Heavenrich ......... G06F 17/2264 |
| 2017/0003937 | A1* | 1/2017 | Huebra .................... G06F 8/20 |
| 2017/0337268 | A1* | 11/2017 | Ait-Mokhtar ............ G06N 5/02 |

OTHER PUBLICATIONS

Harmain, H. M., and Robert Gaizauskas. "Cm-builder: A natural language-based case tool for object-oriented analysis." Automated Software Engineering 10.2 (2003): 157-181. (Year: 2003).*

Bajwa, Imran Sarwar, Behzad Bordbar, and Mark G. Lee. "OCL constraints generation from natural language specification." Enterprise Distributed Object Computing Conference (EDOC), 2010 14th IEEE International. IEEE, 2010. (Year: 2010).*

Crapo, Andrew, and Abha Moitra. "Toward a unified English-like representation of semantic models, data, and graph patterns for subject matter experts." International Journal of Semantic Computing 7.03 (2013): 215-236. (Year: 2013).*

Bryant, Barrett R. et al., "Two-Level Grammar as an Object-Oriented Requirements Specification Language", Proceedings of the 35th Annual Hawaii International Conference on System Sciences, HICSS, Jan. 10-10, 2002, 10pgs.

Shaikh, A. J. et al., "Framework for Web Content Mining Using Semantic Search and Natural Language Queries", 2013 IEEE International Conference on Computational Intelligence and Computing Research (ICCIC), Dec. 26-28, 2013, 5pgs.

Shukla , V N et al., "An Approach to Integrate Translation Memory in MT System for English to Indian Language", International Conference on Cognitive Computing and Information Processing (CCIP), Mar. 3-4, 2015, 4pgs.

Extended European Search Report and Opinion issued in connection with corresponding EP Application No. 18174162.0 dated Oct. 22, 2018, 9pgs.

* cited by examiner

200

```
┌─────────────────────────────────────────────┐
│  RECEIVE A TEXTUAL REPRESENTATION OF A      │
│  NATURAL LANGUAGE EXPRESSION FOR A          │
│  SYSTEM REQUIREMENT                     205 │
└─────────────────────────────────────────────┘
                      │
                      ▼
┌─────────────────────────────────────────────┐
│  ANALYZE THE TEXTUAL REPRESENTATION OF      │
│  THE NATURAL LANGUAGE EXPRESSION TO         │
│  DETERMINE A NATURAL LANGUAGE OBJECT,       │
│  THE NATURAL LANGUAGE OBJECT INCLUDING THE  │
│  TEXTUAL REPRESENTATION OF THE NATURAL      │
│  LANGUAGE EXPRESSION AND SYNTACTIC          │
│  ATTRIBUTES DERIVED THEREFROM           210 │
└─────────────────────────────────────────────┘
                      │
                      ▼
┌─────────────────────────────────────────────┐
│  TRAVERSE A GRAMMAR GRAPH REPRESENTATION    │
│  OF A MODELING LANGUAGE TO DETERMINE A      │
│  PARTIAL TRANSLATION OF THE NATURAL         │
│  LANGUAGE OBJECT, THE PARTIAL TRANSLATION   │
│  INCLUDING AT LEAST ONE ONTOLOGY CONCEPT    │
│  PLACEHOLDER                            215 │
└─────────────────────────────────────────────┘
                      │
                      ▼
┌─────────────────────────────────────────────┐
│  DETERMINE ONTOLOGY CONCEPTS CORRESPONDING  │
│  TO THE AT LEAST ONE ONTOLOGY CONCEPT       │
│  PLACEHOLDER TO COMPLETE A TRANSLATION OF   │
│  THE TEXTUAL REPRESENTATION                 │
│  OF THE NATURAL LANGUAGE EXPRESSION     220 │
└─────────────────────────────────────────────┘
                      │
                      ▼
┌─────────────────────────────────────────────┐
│  GENERATE A RECORD OF THE COMPLETED         │
│  TRANSLATION                            225 │
└─────────────────────────────────────────────┘
```

305 → A → ARITH-EXPR
310 → ARITH-EXPR → VALUE ARITH-OPR VALUE
315 → ARITH-OPR → "+" | "-" | "*" | "/"
320 → VALUE → *number*

METHODS AND SYSTEMS FOR TRANSLATING NATURAL LANGUAGE REQUIREMENTS TO A SEMANTIC MODELING LANGUAGE STATEMENT

BACKGROUND

The field of the present disclosure relates generally to software requirements, more particularly, to systems, devices and methods of automatically translating natural language expressions of a software requirement to a modeling language representation thereof.

In some contexts, many software faults might originate from errors in the requirements engineering process, wherein the costs to fix such software faults can increase significantly as the development of the software progresses. A source of the software faults may be based on (initial) software requirements being written in a natural language where the natural language may be unintentionally or inherently vague or inconsistent and the consequences of these realities might not be immediately evident. Moreover, performing software requirement translations from a natural language expression to a machine-readable expression representation of the software requirement by hand is a costly and time-consuming process.

In some respects, replacing natural language requirements with equivalent representations in a modeling language might facilitate automated requirements analysis and test generation such that errors and inconsistencies attributed to the natural language expression of the software requirements might be discovered early in the software development process.

Therefore, there exists a need for methods and systems that improve automated natural language software requirement translations.

BRIEF DESCRIPTION

In one aspect, an embodiment of the present disclosure relates to receiving a textual representation of a natural language expression for a system requirement; analyzing the textual representation of the natural language expression to determine a natural language object, the natural language object including the textual representation of the natural language expression and syntactic attributes derived therefrom; traversing a grammar graph representation of a modeling language to determine a partial translation of the natural language object, the partial translation including at least one ontology concept placeholder; determining ontology concepts corresponding to the at least one ontology concept placeholder to complete a translation of the textual representation of the natural language expression; and generating a record of the completed translation.

In other embodiments, a system may implement, execute, or embody at least some of the features of the processes herein. In yet another example embodiment, a tangible medium may embody executable instructions that can be executed by a processor-enabled device or system to implement at least some aspects of the processes of the present disclosure.

DRAWINGS

These and other features, aspects, and advantages of the present disclosure will become better understood when the following detailed description is read with reference to the accompanying drawings in which like characters represent like parts throughout the drawings, wherein:

FIG. 2 is an illustrative example of a natural language software requirement translation process, according to some aspects herein;

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Figure 1:
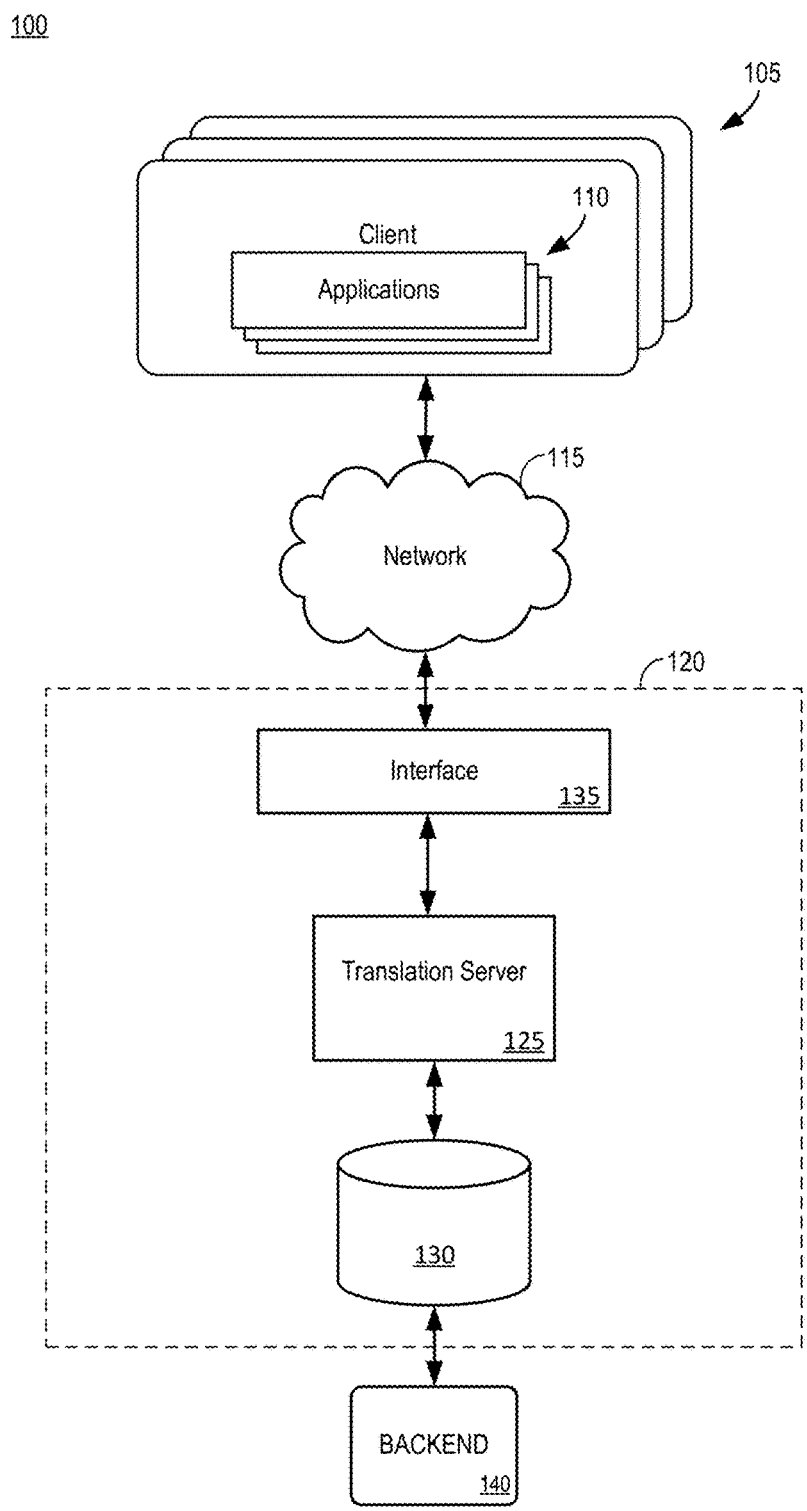
FIG. 1 is an example block diagram of a system.

FIG. 1 is an illustrative block diagram of an architecture or system 100, in one example. Examples of some embodiments of the present disclosure are not limited to the particular architecture 100 shown in FIG. 1. System 100 includes one or more client devices 105 running one or more applications 110. Applications 110 may include different software applications that support the operations and process of an organization. In some embodiments, One of the applications 110 may include, at least in part, functionality or a tool to assist a user in translating natural language software requirements to a semantic modeling language that is readable by both human users and machine entities. As used herein, a software requirement refers to a function, instruction, or operation to be executed a machine, including a processor and/or logic thereof. In some aspects, a natural language description of a software requirement herein might be expressed in English. However, the present disclosure is not limited to providing translations for English-based natural language descriptions of software requirements. In some embodiments, applications 110 may be configured to facilitate, support, and execute a program to generate a translation of a natural language description of a software requirement in a cloud computing platform.

The cloud platform 120 may include an interface gateway 135 to facilitate, enable, and support communication between clients 105 and a translation server 125. The devices at 105 may execute a browser that is used by a user to interface with cloud platform 120 via network 115.

Translation server 125 may be associated with storage device 130 such as, but not limited to, a storage area network. In some embodiments, cloud platform 120 may include more than one instance of a server such as translation server 125 and more than one data storage device 130. Storage device 130 may comprise any query-responsive data source or sources that are or become known, including but not limited to a relational database management system. Data stored in the storage device 130 may be stored as part of a relational database, a multi-dimensional database, an Extensible Markup Language (XML) document, or any other data storage system storing structured and/or unstructured data. The data may be distributed among several relational databases, multi-dimensional databases, and/or other data sources. In some embodiments, storage device 130 may be implemented as an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Embodiments are not limited to any number or types of data sources. Translation server 125 may comprise a computing device that processes requests using a computer processor.

System 100 further includes a backend system that can generate, automatically, in response to a request or call from cloud platform 120, executable code or instructions to perform a process to translate and/or support the translation of a natural language description of a software requirement. In some aspects herein, a user may provide an indication or request for one or more software requirement translations, as implemented in an application 110 and/or cloud platform 120 via network 115, which may operate in cooperation with the processing of a backend system 120 to generate a response to effectuate the translation of a natural language software requirement input.

In one example, a client 105 executes an application 110 to generate a translation of a natural language software requirement input via a user interface (UI) to a user on a display of client 105. The user may manipulate UI elements within the UI, via touchscreen, keyboard, or audio entries, to indicate and specify a software requirement in a natural language format to be automatically translated, where the cloud platform 120, in cooperation with server database 130 and possibly backend system 140, generate, for example, a translation that is readable or understandable by both a human user and a machine entity.

FIG. 2 is an illustrative depiction of a framework or process 200 for translating a natural language expression of a software requirement to a structured natural language that can be understood by both a human and a machine. In the present disclosure, the natural language expression of the software requirement (i.e., the natural language requirement) might be transformed to equivalent representations in a modeling language to facilitate, for example, automated requirements analysis and test generation to aid in a software development process. In some embodiments, Semantic Application Design Language (SADL) Requirements Language (SRL) statement(s) might be generated to represent the natural language requirement. SADL is a controlled-English language and development environment that can be used to generate a W3C (World Wide Web Consortium) recommended OWL (Web Ontology Language) ontology. However, the ontology could be generated by other means and need not be limited to OWL, which is just one of multiple languages that could be used for the ontology. Likewise, while some of the embodiments and examples herein may be discussed in the context of using SRL, other languages with defined grammars and semantics could also be used and are within the scope of the present disclosure.

In some aspects, a system ontology (e.g., SADL) is provided to, obtained by, or otherwise accessible or known by a system or device executing process 200 prior to or during the execution of process 200

At operation 205, a textual representation of a natural language expression for a software requirement is received by the system or device performing process 200. In some embodiments, the text-based natural language may be received from a user entity via a keyboard entry, touchscreen entry, or a speech-to-text mechanism. In some embodiments, the ontology mentioned above might be included with the natural language expression for the software requirement.

At operation 210, the textual representation of the natural language expression can be analyzed to determine a natural language object. As used herein, a natural language object is a data structure that can include syntactic attributes of the software requirement, as determined from an analysis of the natural language expression for the software requirement. In some embodiments, the syntactic attributes might include, for example, part-of-speech tags for tokens (i.e., individual words in the natural language expression), dependencies between the tokens, and other properties/characteristics of the requirement. In addition to including the derived or otherwise learned syntactic attributes of the requirement, the natural language object might also include the original text of the requirement. The natural language object determined or generated at operation 210 may be used in further operations of process 200.

In some embodiments, operation 210 may include processing the natural language expression of the requirement by or through a natural language processing (NLP) pipeline. The NLP may operate to process the natural language expression to generate one or more syntactic attributes, including, for example, part-of-speech, dependency, tokenization, and parse tree information for the text provided in the natural language expression.

At operation 215, a grammar graph representation of a modeling language, the SRL grammar, can be traversed to determine a partial translation of the natural language object. The partial translation may include at least one ontology concept placeholder. In some aspects, the partial translation including the ontology concept placeholders may be referred to a requirement template.

Figures 3, 4:
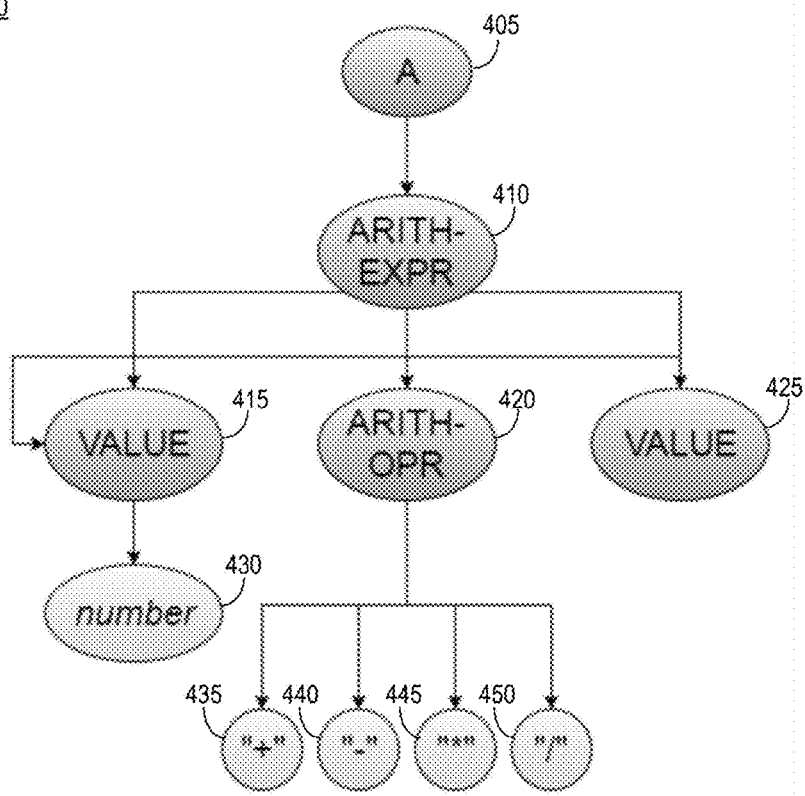
FIG. 3 is an illustrative depiction of one example of an illustrative grammar, according to some aspects herein.
FIG. 4 is an example graph representation of the illustrative grammar of FIG. 3, according to some embodiments herein.

In some embodiments, the natural language object might logically be input to a rule-head vertex of a grammar graph representation, where the rule-head vertex represents the starting rule of the grammar. In some aspects, a translation system herein uses a graph representation of the SRL grammar to map portions of the requirement to SRL expressions and to further combine the obtained expressions into a valid SRL statement. FIG. 3 is an illustrative, though simplified, example of a grammar E for generating simple arithmetic expressions. As an example, a graph $G_E = \langle V, E \rangle$ represents the production rules of the grammar E. The set of vertices $V = V_R \cup V_T$, where $V_R$ represents rule heads and non-terminal productions and $V_T$ represents terminals of the grammar. As such, the vertices of $V_R$ and $V_T$ are referred to as rule-head vertices and terminal vertices, respectively. The edges E denote rule head to production relationships. For example, given the extremely simple grammar A→a, the corresponding graph contains two vertices, A (the rule head) and a (the production) with a single edge from A to a.

Referring to FIG. 3, a sample grammar E 300 conveys A is an arithmetic expression (305); the arithmetic expression is defined as a value—arithmetic operator – value (310) statement; the arithmetic operators are defined as being one of "+", "−", "*", and "/" (315); and the value term is defined as being a number (320). In the example of FIG. 3, the terminal number is used in place of a production rule and generates a number n∈R.

FIG. 4 is an illustrative depiction of a grammar graph $G_E$ 400 for the grammar E shown in FIG. 3. In some embodiments, a grammar graph herein may be constructed by a translation server (e.g., FIG. 1, 125) at an initialization stage by reading the content of a provided grammar file into an intermediate dictionary form. The dictionary might contain the rules of the grammar and can be referenced to recursively build the graph using the exact orderings of the productions given in the original grammar file. In some aspects, this feature might be important to the construction of valid SRL statements.

In the example of FIG. 4, rule-head vertices of $G_E$ 400 are shown at 405, 410, 415, 420, and 425. The rule-head vertices include instructions of how to process an incoming a natural language or NLP object. For example, if the vertex ARITH-EXPR (410) receives the NLP object for the natural language text of "one divided by seven", it will know how to use rule-based and/or statistical methods to identify the chunks of the text that correspond to its child vertices and it will process the text chunks accordingly.

Terminal vertices of $G_E$ 400, shown at 430, 435, 440, 445, and 450, operate to output a string representation of the terminal. If the terminal represents a placeholder for an ontology concept or a value, the vertex appends the terminal string to the incoming text chunk so that the system knows to try to find a mapping for the text chunk to an ontology concept in a future stage of a translation herein. In the present example (i.e., "one divided by seven"), the text chunks "one" and "seven" will both reach the terminal node 430 representing number. This vertex will write "one-number" and "seven-number" along with their respective token IDs to the NLP object for use in a further concept matching operation.

In some embodiments, as shown in FIG. 4, if a rule-head vertex appears more than once in the grammar, it is pointed back to the original occurrence of the vertex rather than reproducing identical production rule subgraphs. This significantly reduces the time and space required to construct and store the graph.

In some embodiments, an input text string is parsed and distributed throughout a grammar graph using depth-first exploration to obtain an accurate ordering of the expressions. For example, consider the rule ARITH-EXPR→VALUE ARITH-OPR VALUE in grammar E. In response to the incoming text being divided into chunks corresponding to each of the three productions, an exploration algorithm can pass text to the first VALUE vertex and only when that vertex returns a value will it send the next piece of text to the ARITH-OPR vertex, and so on. All subsequent results can be appended to a string representing the SRL statement until the string reaches the rule-head node representing the starting rule of the grammar. In some embodiments, the system can build an SRL object containing the translation with ontology concept placeholders and the list of placeholder to text mappings, wherein this and the original NLP object can be transmitted to the final stage of the translation process.

Proceeding to operation 220, the system tries to find corresponding ontology concepts to match the concept placeholders produced in the graph-based translation operation at 215. This may be accomplished in some embodiments using an approach such as substring matching. However, other approaches and techniques may be used. In some embodiments, the partial translation is converted to a complete translation by mapping ontology concepts to the ontology concept placeholders in the requirement template from operation 215 to obtain a SRL statement representation of the natural language requirement.

At operation 225, a record of the completed translated is generated. The record may be transmitted to the user or other entity that requested or otherwise invoked an initial request for the translation of the natural language requirement at operation 205. In some instances, the record of the completed translation might be stored in a data store or database, for further reporting, analysis, and processing purposes.

Figure 5A:
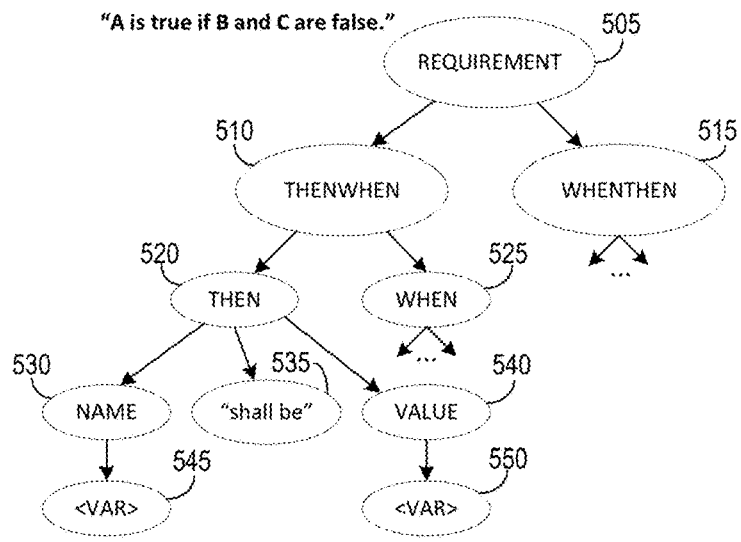
FIGS. 5A-5E illustrate various aspects of a grammar graph translation process, according to some embodiments herein.
Figure 5B:
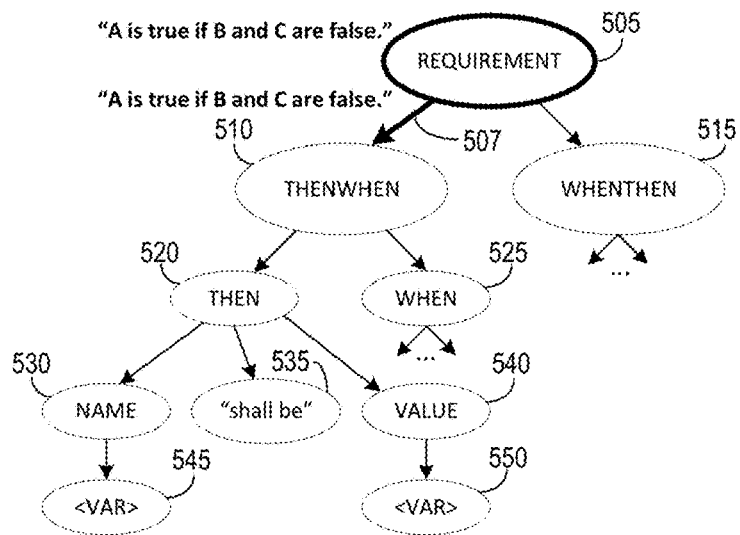
Figure 5C:
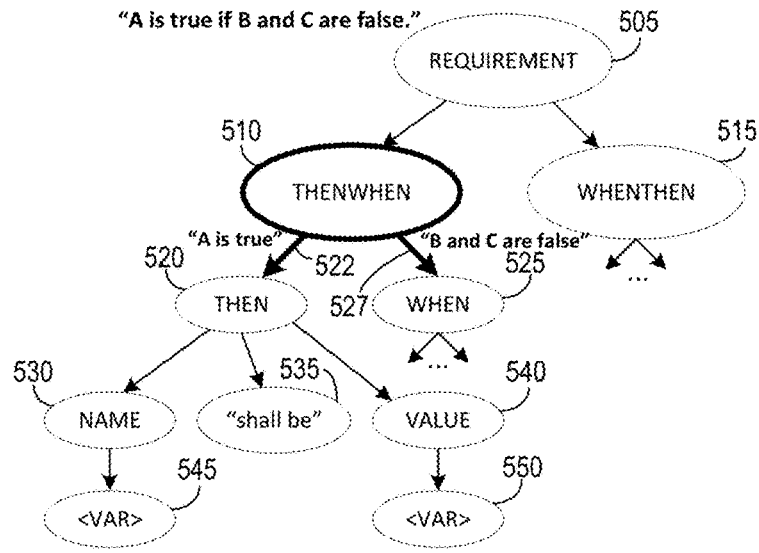

FIGS. 5A-5E illustrate various aspects of a grammar graph translation process, including an example flow of input natural language text through the translation process, according to some embodiments herein. FIG. 5A includes a grammar graph 500. Grammar graph 500 includes a number of production rule vertices 505, 510, 515, 520, 525, 530, and 540 that embody the rules for handling and distributing incoming text. Additionally, graph 500 includes a number of terminal vertices 535, 545, and 550 that return a value of the terminal node. In the example grammar graph 500 shown in FIG. 5A, the input of natural language expression "A is true if B and C are false." is received by rule-head 505. This software requirement is passed along edge 507 to rule vertex 510 as illustrated in FIG. 5B. From rule-head 510, the text is divided into its constituent parts of its then/when expression (i.e., "A is true" & "B and C are false") and passed to vertices 520 (THEN) and 525 (WHEN) via edges 522 and 527, respectively, as illustrated in FIG. 5C.

Figure 5D:
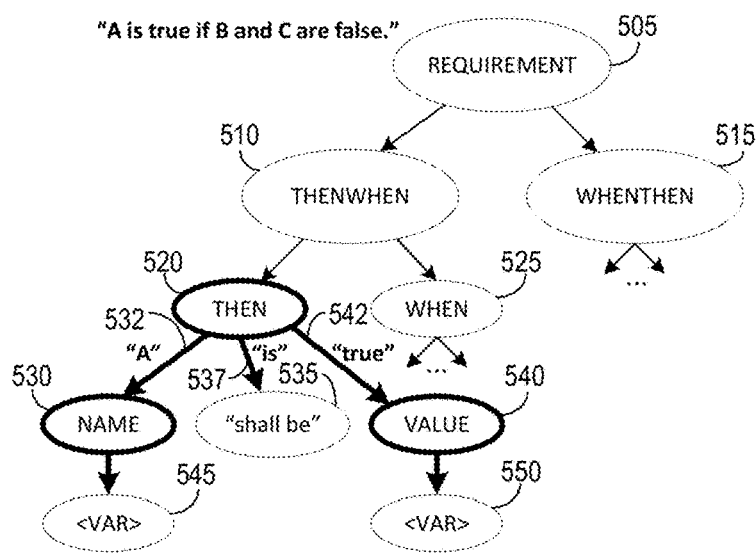
Figure 5E:
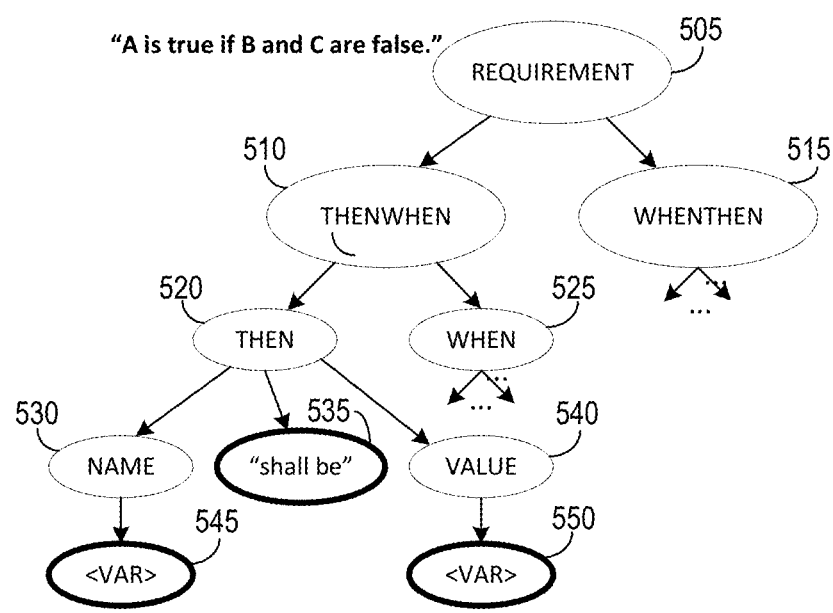
Figure 6:
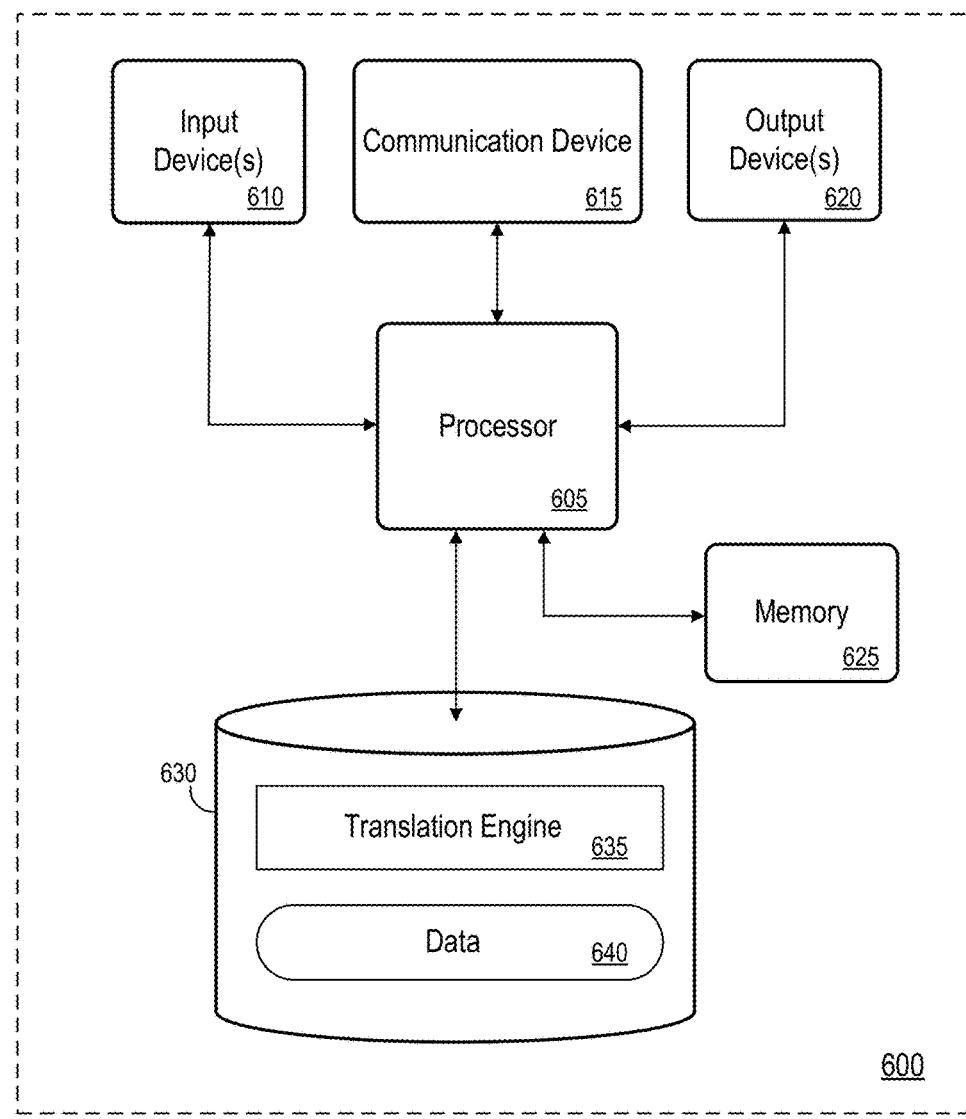
FIG. 6 is an illustrative depiction of a block diagram of a system or device that can support some processes disclosed herein.

In FIG. 5D, the text chunk/portion "A is true" is further decomposed from vertex 520 and mapped to vertices 530 (i.e., rule vertex "NAME"), 535 (i.e., grammar string "shall be"), and 540 (i.e., rule vertex "VALUE") via edges 532, 537, and 542, respectively. FIG. 5E illustrates the terminal vertices including placeholders 545 (<VAR>, e.g., "A") and 550 (<VAL>, e.g., "true"). Per the processing of the natural language input of "A is true if B and C are false.", a partial or template translation is obtained by traversing grammar graph 500. In this example, the requirement template might be expressed as "Requirement R1: <VAR> shall be <VAL> when <VAR> is <VAL> and <VAR> is <VAL>."

In some aspects, the present disclosure provides a technical solution that can reduce the cost and time of translating new or existing software requirements to an equivalent structured language (e.g., SRL) statement by partially automating the process, particularly as compared to software translations that are currently performed manually by people. In some aspects, the present disclosure might technically operate to increase the effectiveness of a user (e.g., a requirements engineer) by providing a tool to increase their fluency in the modeling language. In some other aspects, the present disclosure may be used to build or otherwise develop a corpus of expert-vetted pairs of natural language requirements and their corresponding formal model translations, where such a corpus can be used to assist, train, and facilitate "deep learning"-based translation aids and/or systems.

Apparatus 600 includes processor 605 operatively coupled to communication device 615 to communicate with other systems, data storage device 630, one or more input devices 610 to receive inputs from other systems and entities, one or more output devices 620 and memory 625. Communication device 615 may facilitate communication with other systems and components, such as other devices, a communications network, and a server. Input device(s) 610 may comprise, for example, a keyboard, a keypad, a mouse or other pointing device, a microphone, knob or a switch, an infra-red (IR) port, a docking station, and/or a touch screen. Input device(s) 610 may be used, for example, to enter information into apparatus 600 such as a natural language expression of a software requirement. Output device(s) 620 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), solid state storages device, optical storage devices, Read Only Memory (ROM) devices, Random Access Memory (RAM), Storage Class Memory (SCM) or any other fast-access memory. Data storage device 630 might store flight data plans, optimized controls command by some embodiments herein, etc.

Translation engine 635 and data 640 may comprise program instructions executed by processor 605 to cause apparatus 600 to perform any one or more of the processes described herein, including but not limited to aspects disclosed in FIGS. 2-5E. Embodiments are not limited to execution of these processes by a single apparatus.

Data 640 (either cached or a full database) may be stored in volatile memory such as memory 625. Data storage device 630 may also store data and other program code for providing additional functionality and/or which are necessary for operation of apparatus 600, such as device drivers, operating system files, etc. Data 640 may include performance data related software requirement translations that may be used in future software requirement translation tuning and/or optimization purposes.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed includes:

1. A method, implemented by a processor, of translating a natural language requirement to a semantic modeling language statement, the method comprising:
   receiving a textual representation of a natural language expression for a system requirement;
   analyzing, by the processor, the textual representation of the natural language expression to determine a natural language object, the natural language object including the textual representation of the natural language expression and syntactic attributes derived therefrom;
   traversing, by the processor, a grammar graph representation of a modeling language to determine a partial translation of the natural language object, the partial translation including at least one ontology concept placeholder;
   determining, by the processor, ontology concepts corresponding to the at least one ontology concept placeholder to complete a translation of the textual representation of the natural language expression; and
   generating a record of the completed translation.

2. The method of claim 1, wherein the natural language expression is expressed in English.

3. The method of claim 1, wherein the analyzing of the textual representation of the natural language expression to determine the natural language object is performed, at least in part, by a natural language processing mechanism.

4. The method of claim 1, wherein the modeling language is a Semantic Application Design Language (SADL) Requirements Language (SRL).

5. The method of claim 4, wherein the SRL comprises a constrained SRL.

6. The method of claim 4, wherein the traversing of the grammar graph to determine the partial translation of the natural language object comprises:
   dividing the natural language object into portions;
   mapping the portions of the natural language object onto SRL expressions;
   combining the mapped to SRL expressions to form a valid SRL statement including the at least one ontology concept placeholder.

7. The method of claim 1, wherein the at least one ontology concept placeholder is a token representation of a specific ontology domain concept.

8. The method of claim 1, wherein the partial translation of the natural language object further includes a listing of a mapping of the at least one ontology concept placeholder to text of the textual representation of the natural language expression.

9. The method of claim 1, further comprising receiving the grammar graph representation of the modeling language.

10. A system comprising:
    a memory storing processor-executable instructions; and
    a processor to execute the processor-executable instructions to cause the system to:
      receive a textual representation of a natural language expression for a system requirement;
      analyze the textual representation of the natural language expression to determine a natural language object, the natural language object including the textual representation of the natural language expression and syntactic attributes derived therefrom;
      traverse a grammar graph representation of a modeling language to determine a partial translation of the natural language object, the partial translation including at least one ontology concept placeholder;
      determine ontology concepts corresponding to the at least one ontology concept placeholder to complete a translation of the textual representation of the natural language expression; and
      generate a record of the completed translation.

11. The system of claim 10, wherein the natural language expression is expressed in English.

12. The system of claim 10, wherein the analyzing of the textual representation of the natural language expression to determine the natural language object is performed, at least in part, by a natural language processing mechanism.

13. The system of claim 10, wherein the modeling language is a Semantic Application Design Language (SADL) Requirements Language (SRL).

14. The system of claim 13, wherein the SRL comprises a constrained SRL.

15. The system of claim 13, wherein the processor is further enabled to execute the processor-executable instructions to cause the system to:

divide the natural language object into portions;

map the portions of the natural language object onto SRL expressions;

combine the mapped to SRL expressions to form a valid SRL statement including the at least one ontology concept placeholder.

16. The system of claim 10, wherein the at least one ontology concept placeholder is a token representation of a specific ontology domain concept.

17. The system of claim 10, wherein the partial translation of the natural language object further includes a listing of a mapping of the at least one ontology concept placeholder to text of the textual representation of the natural language expression.

18. The system of claim 10, wherein the processor is further enabled to execute the processor-executable instructions to cause the system to receive the grammar graph representation of the modeling language.

19. A non-transitory tangible computer-readable medium having processor-executable program instructions stored thereon, the medium comprising:

program instructions to receive a textual representation of a natural language expression for a system requirement;

program instructions to analyze the textual representation of the natural language expression to determine a natural language object, the natural language object including the textual representation of the natural language expression and syntactic attributes derived therefrom;

program instructions to traverse a grammar graph representation of a modeling language to determine a partial translation of the natural language object, the partial translation including at least one ontology concept placeholder;

program instructions to determine ontology concepts corresponding to the at least one ontology concept placeholder to complete a translation of the textual representation of the natural language expression; and program instructions to generate a record of the completed translation.

20. The non-transitory medium of claim 19, wherein the at least one ontology concept placeholder is a token representation of a specific ontology domain concept.

* * * * *